United States Patent [19]

Burroughs

[11] Patent Number: 4,916,380

[45] Date of Patent: Apr. 10, 1990

[54] REGULATED SWITCHING POWER SUPPLY WITH COMPLEX OUTPUT FILTER

[75] Inventor: James A. Burroughs, San Jose, Calif.

[73] Assignee: Honeywell Inc., Minneapolis, Minn.

[21] Appl. No.: 315,637

[22] Filed: Feb. 27, 1989

[51] Int. Cl.⁴ .............................................. G05F 1/56
[52] U.S. Cl. .................................... 323/282; 323/266; 363/47; 363/89; 363/17; 333/181
[58] Field of Search .................... 323/266, 282–287, 323/290; 363/39, 45–47, 89, 124, 17; 333/167, 175, 181

[56] References Cited

U.S. PATENT DOCUMENTS

2,134,522  10/1938  Lee ........................................ 363/47
3,564,384   2/1971  Adler ..................................... 363/17

Primary Examiner—Peter S. Wong
Attorney, Agent, or Firm—Seymour Levine; Roger W. Jensen; Albin Medved

[57] ABSTRACT

A power supply with a pulse width modulation switching mode voltage regulator having an output filter with an attenuation notch at the switching frequency of the pulse width modulator. The output filter comprises an input inductor and a series connected tank circuit with a shunt capacitor. The tank circuit is comprised of a shunt connected L-C circuit tuned to the switching frequency.

5 Claims, 4 Drawing Sheets

REGULATED SWITCHING POWER SUPPLY WITH COMPLEX OUTPUT FILTER

This invention was made with United States Government support and the United States Government has certain rights therein.

BACKGROUND OF THE INVENTION

1. Field of the Invention

The invention relates to power supplies utilizing pulse width modulated switching mode voltage regulation, particularly with respect to the output filter thereof.

2. Description of the Prior Art

Power supplies are known in the art utilizing switching mode voltage regulation ("Buck" Regulator). In such a power supply, the input AC voltage is converted to an input DC voltage by a rectifier section and filtered by an input filter. The filtered input DC is applied to a switching circuit that converts the filtered input DC to a pulse width modulated signal. The pulse width modulated signal is applied through an output filter to provide the regulated output voltage. The output voltage is fed back to the pulse width modulator to vary the duty cycle of the pulse width modulation in accordance with a comparison with a voltage reference. Thus, the duty cycle is varied to regulate the output voltage in accordance with the reference. The output filter comprises a smoothing filter to remove the carrier frequency of the modulation switching from the output voltage. In present day designs, it is often desirable to provide a high power, high component density, low bulk, low loss supply.

The output smoothing filter traditionally utilized in such voltage regulators is usually comprised of one or more inductor-capacitor (L-C) lowpass filter sections to remove the AC component introduced by the pulse width modulation and to provide a low ripple DC output. Each section of such a filter is comprised of a series inductor and a shunt capacitor. Generally, the output filter is designed with a cut-off frequency several decades below the fundamental switching frequency to provide adequate ripple rejection.

The design of the conventional output filter results in filter component values representing a compromise between the requirement to provide a sufficiently high value of filter inductance at a given direct current bias level, the physical bulk of the inductor and the resistive and frequency dependent losses of the inductor. Additionally, the filter capacitor should be selected from units that provide both a low series resistance at high frequency and a high capacitance value. The combined requirement for a relatively low cut-off frequency and low losses results in a substantially bulky unit. In high power, high density power supplies, the output filter generally occupies a significant percentage of the power supply bulk and contributes substantially to the power losses of the unit.

In addition, the low cut-off frequency required to provide adequate ripple rejection conflicts with the design requirements for the power supply error loop feedback control system. Additionally, the high phase shift introduced by multiple L-C filter sections introduces further difficulties into the feedback control system design. It is therefore appreciated that the design constraints of the conventional approach to switching power supply output filtering result in a single L-C section with a bulky filter inductor and capacitor or the use of multiple sections with an undesirably high phase shift.

The input inductor in such an L-C filter section has a high AC ripple current therethrough introducing significant losses. The large inductance required to obtain the low cut-off frequency requires numerous windings resulting in significant resistive loss. Additionally, the large inductance value requires the use of magnetic core materials to implement the inductor with a practical bulk. Conventional magnetic materials have a high self-heating loss when subjected to high frequency alternating ripple currents.

It is therefore appreciated from the foregoing that the smoothing output filter utilized in a conventional buck regulator is undesirably bulky and lossy introducing design difficulties in high density power supplies.

It is further appreciated that the conventional L-C output filter experiences undesirable variations in ripple at the switching frequency with variations in capacitance of the power supply load.

SUMMARY OF THE INVENTION

The disadvantages of the prior art are obviated by utilizing an output smoothing filter with an attenuation notch in the frequency response thereof at the switching frequency of the pulse modulation regulator. The bandpass cut-off of the filter is higher than the conventional L-C filter simplifying the design of the feedback control system. The filter is comprised of a series input inductor serially coupled to an L-C resonant circuit. A shunt capacitor from the output of the resonant circuit completes the filter design. This output ripple filter configuration tends to have a low phase shift characteristic in the region of interest to the feedback control loop, simplifying the design of the feedback control system and tends to produce a low ripple current in the input inductor of the filter.

DESCRIPTION OF THE PREFERRED EMBODIMENT

Figure 1:
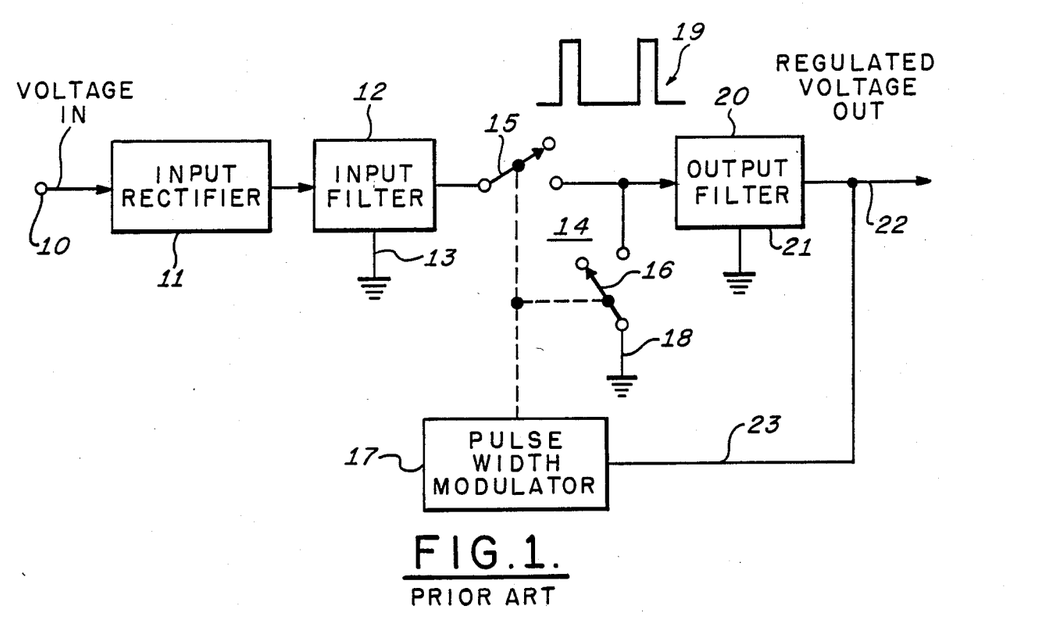
FIG. 1 is a schematic block diagram of a conventional switching mode voltage regulated power supply.

Referring to FIG. 1, the general configuration of a power supply utilizing switching mode voltage regulation is illustrated. The power supply AC input is applied at an input 10 to an input rectifier section 11 to convert the input AC signal to DC. The unfiltered DC from the rectifier section 11 is applied to an input filter 12 to smooth the DC from the rectifier section 11. The input filter 12 is referenced to output signal ground as indicated at 13. The filtered DC from the input filter 12 is applied to a switch section 14. The switch section 14 is comprised of a normally open series switch 15 and a normally closed parallel switch 16. The switches 15 and 16 are controlled by a pulse width modulator section 17 so that when the normally open switch 15 is closed, the normally closed switch 16 is opened. Conversely, when the switch 15 is opened, the switch 16 is closed. The switch 16 is returned to output signal ground as indicated at 18. The pulsed DC voltage output of the switch section 14 is illustrated at 19.

The pulse width modulator 17 varies the duty cycle of the pulsed DC 19 by controlling the operation of the switches 15 and 16. The DC voltage output 19 from the switch section 14 has an average value substantially equal to the required output voltage. The DC voltage 19 is applied to an output filter 20 to remove the unwanted switching frequency components therefrom. The output filter 20 is returned to output signal ground as indicated at 21. The output filter 20 provides the regulated and filtered output voltage of the power supply on a line 22.

The output voltage is fed back to the pulse width modulator 17 via a path 23 to control the duty cycle of the pulsed DC voltage 19. The output voltage on the path 23 is compared within the pulse width modulator 17 to an internal voltage reference so as to generate an error voltage to control the duty cycle switching of the switching section 14. The duty cycle of the pulsed DC voltage 19 is controlled to maintain the output voltage on the line 22 equal to the internal reference of the pulse width modulator 17.

Figure 2:
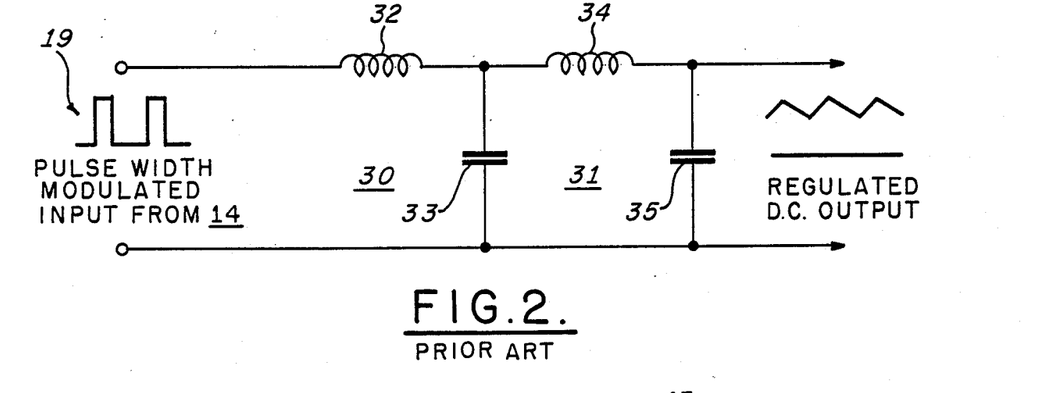
FIG. 2 is a schematic diagram of an L-C output ripple filter of the type conventionally utilized in the switching power supply of FIG. 1.
Figure 4A:
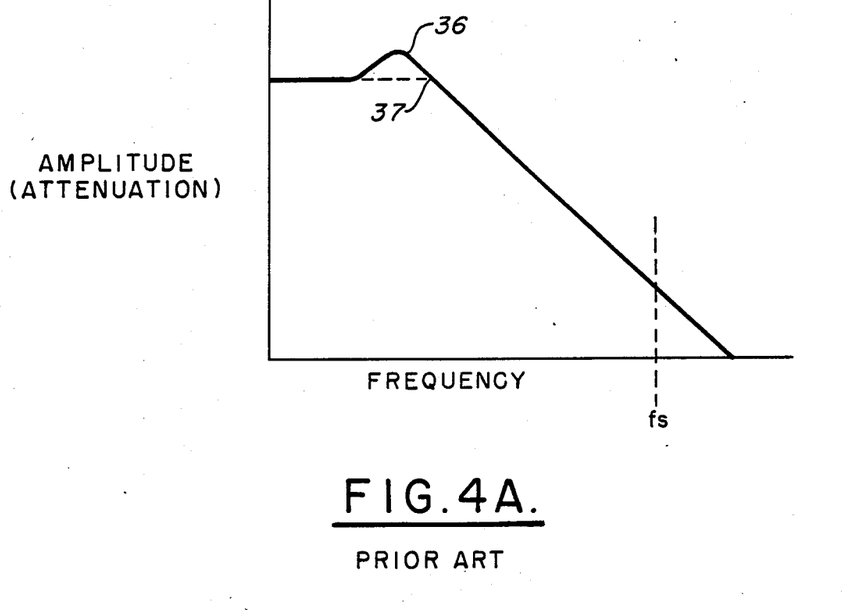
FIG. 4A is a graph of the frequency response of the prior art filter of FIG. 2.

Referring to FIGS. 2 and 4A, a prior art filter suitable for use as the output filter 20 of FIG. 1 and the frequency response thereof are illustrated, respectively. The filter of FIG. 2 is comprised of two cascaded L-C lowpass filter sections 30 and 31. The filter section 30 is comprised of a series inductor 32 and a shunt capacitor 33. The filter section 31 is comprised of a series inductor 34 and a shunt capacitor 35. It is appreciated that the output filter 20 (FIG. 1) may be implemented utilizing only section 30 or plural cascaded filter sections such as 30 and 31. FIG. 4A illustrates the frequency response of the filter of FIG. 2. The attenuation response at the carrier switching frequency is illustrated at $f_S$. The frequency response characteristic of FIG. 4A exhibits a peak 36 at the cut-off frequency 37 of the response characteristic of FIG. 4A. It is appreciated that the output filter of FIG. 2 suffers from all of the limitations and disadvantages discussed above.

Figure 3:
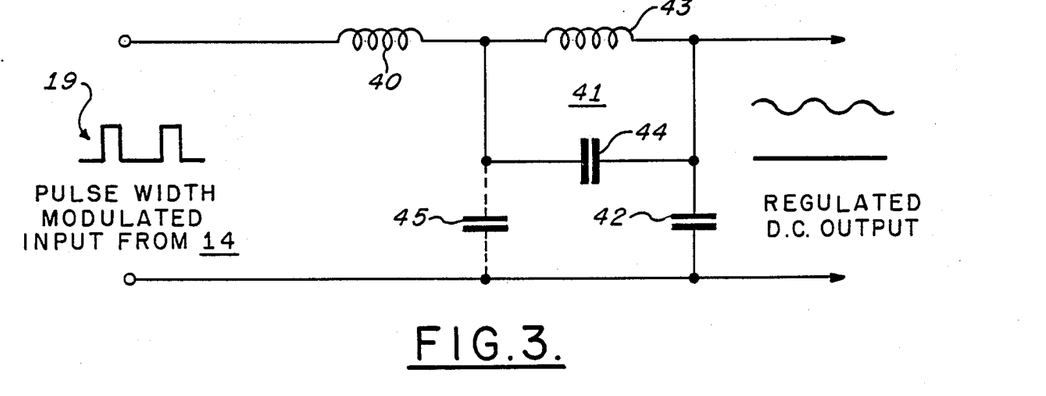
FIG. 3 is a schematic diagram of an output ripple filter for use in the switching power supply of FIG. 1 in accordance with the present invention.
Figure 4B:
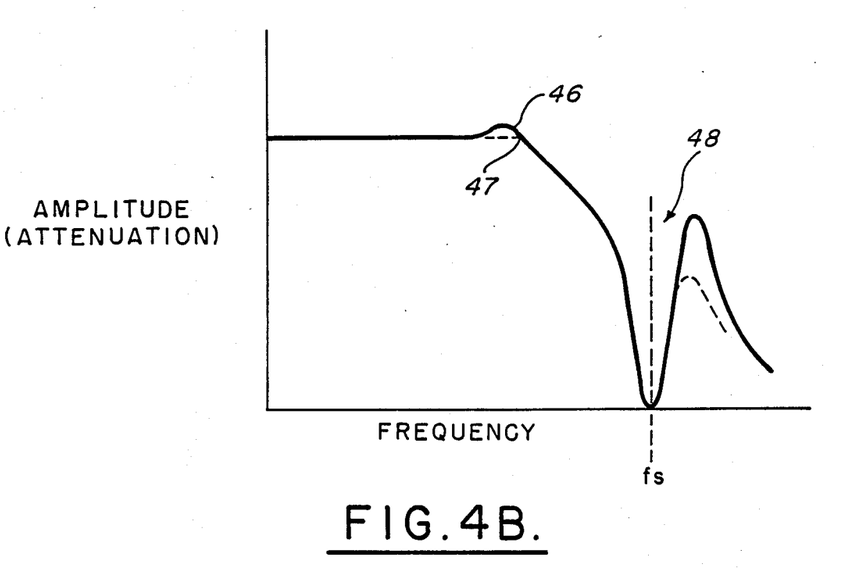
FIG. 4B is a graph of the frequency response of the output filter of FIG. 3 configured in accordance with the invention.

Referring to FIGS. 3 and 4B, the output filter configuration in accordance with the present invention and the response characteristic thereof are illustrated, respectively. The filter of FIG. 3 comprises an input inductor 40 in series with an L-C resonant tank circuit 41 shunted by an output capacitor 42. The tank circuit 41 is comprised of an inductor 43 and a capacitor 44. A shunt input capacitor 45 is shown in dotted line. Although the capacitor 45 may be utilized in practicing the invention, it is preferably eliminated. The response characteristic of FIG. 4B has a peak 46 at the cut-off frequency 47. The tank circuit 41 is tuned to the switching frequency $f_S$ of the switching section 14 of the regulator of FIG. 1 resulting in an attenuation notch 48 at $f_S$.

The low frequency cut-off 47 is determined by the series combination of the input inductor 40 and the low frequency impedance of the resonant tank circuit 41 coacting with the output capacitor 42. At low frequencies, the impedance of the tank circuit 41 approximates the impedance of the inductor 43. The attenuation notch 48 is set at the switching frequency of the switching section 14 of FIG. 1 by the parallel resonance of the inductor 43 and the capacitor 44. The high frequency peak above the switching frequency $f_S$ is determined by the inductive reactance of the tank circuit 41 above the resonance thereof and by the capacitor 42. The high frequency peak shown in dotted line in FIG. 4B occurs in response to including the capacitor 45.

Comparing FIGS. 4A and 4B, the roll off in FIG. 4A after the cut-off frequency 37 is illustrated for the single section embodiment of the filter of FIG. 2. It is observed from FIG. 4B that the filter of the present invention illustrated in FIG. 3 provides single section roll off after the lowpass cut-off frequency 47 but significantly more rapid attenuation above the lowpass cut-off frequency 47 as the carrier switching frequency $f_S$ is approached. The output filter of FIG. 3 selectively filters the carrier switching frequency of the power supply by providing the attenuation notch 48 at the switching frequency. It is therefore appreciated that the filter of FIG. 3 provides significantly greater attenuation at the switching frequency $f_S$ than the prior art filter of FIG. 2. This is evident by a comparison of the attenuation at $f_S$ as illustrated in FIGS. 4A and 4B. It is further appreciated that the peak at cut-off is smaller utilizing the filter of FIG. 3 as compared to the filter of FIG. 2. This is observed by comparing the peak 36 of FIG. 4A with the peak 46 of FIG. 4B.

The more rapid attenuation above the lowpass cut-off frequency obtained with the filter of the present invention permits the use of a higher cut-off frequency for the same attenuation at the switching frequency. In FIGS. 4A and 4B, the cut-off frequency 47 is significantly higher than the cut-off frequency 37. Since the design of the filter of the present invention permits a higher cut-off frequency, the bulk of the associated filter components is greatly reduced in comparison to the prior art filters. In the filter of the present invention, the primary filter inductor 40 has approximately one-fifth the value of the primary inductor utilizing conventional designs at the same output current level. The filter of the present invention occupies approximately one-half to one-third the volume occupied by conventional power supply output filters by utilizing the smaller components permitted by the present design.

It is appreciated from circuit theory that the phase response of the filter of FIG. 3 is significantly smoother in the roll off section of FIG. 4B than the phase characteristic of a two section prior art filter such as illustrated in FIG. 2. The phase characteristic of the prior art filter tends to have large erratic phase shifts above roll off. The smoother phase characteristic of the filter of the present invention as well as the higher cut-off frequency simplifies the design of the power supply error loop by providing greater flexibility in the error loop design. For the same cut-off frequency, the filter of the present invention provides almost forty decibels greater attenuation at the switching frequency than the prior art filter and significantly less pronounced peaking at the cut-off frequency. In the filter of the present invention, the lowpass cut-off frequency is selected as high as possible consistent with good ripple rejection of the carrier frequency and practical component tolerances. The high cut-off frequency in conjunction with the improved smooth phase behavior of the filter of the present invention outside the bandpass of the filter facilitates designing a stable feedback control system for the power supply. Utilization of the filter of the present invention in an actual embodiment thereof provided a ripple reduction of 12-18 db greater than a comparable conventional approach.

It is appreciated that the filter of FIG. 3 including the capacitor 45 is generally of a filter configuration normally utilized for filtering low level signals in communication applications. Such filters are often denoted as cauer or elliptic filters. The design of the filter of the present invention utilized in a high power application is vastly different from the design of such communication filters. In the present invention, it is preferable not to utilize the capacitor 45 ordinarily included in communication elliptic filter sections. Removal of this normally utilized capacitor significantly reduces the high frequency ripple current into the input inductor 40 greatly reducing losses introduced by the filter. FIG. 4B illustrates that this improvement is at the expense of minimum out-of-band attenuation. Lowering the AC ripple current in the input inductor 40 is an important consideration in power applications but not in low power signal processing filters. Since the filter of FIG. 3 is primarily utilized for removal of the carrier switching frequency $f_S$ and the odd harmonics thereof and is not intended for broad band communications signal filtering, the tradeoff of improvement in high frequency ripple current into the large input inductor 40 against the lower out-of-band attenuation is beneficial. Utilizing a modified cauer or elliptic function filter instead of the conventional cascade of L-C filter sections reduces bulk and losses by a factor of 2 or 3.

The present invention modifies complex signal processing filter designs so that they are applicable to power conditioning use. The filter of the present invention provides improved rejection of the unwanted high frequency ripple switching frequency from the output of the power supply. The present invention reduces component mass and bulk and provides improved frequency reponse characteristics. The present invention utilizes a more mathematically complex topology than is utilized in prior art output filters for switching power supplies to provide a filter that has single section filter attenuation characteristics near cut-off and an attenuation notch at the switching frequency. The capacitor normally utilized in such a configuration is eliminated to lower ripple in the inductor 40. A comparison of FIGS. 4A and 4B indicates that the relative filter peaking at cut-off is desirably minimized when utilizing the present invention and that the attenuation at the carrier switching frequency is desirably maximized. The filter of the present invention provides the desirable characteristics of good rejection and high output impedance at the switching carrier frequency and odd harmonics thereof. The filter of the present invention also minimizes variations in ripple reduction of the switching frequency with variations in load capacitance since variations in output capacitance will not affect the resonant or trap frequency of the tank circuit 41. Thus, the present invention advantageously maintains good ripple rejection despite variations in output load capacitance.

It is appreciated that in the low signal level communication filter technology, the attenuation notch is generally not a sharp notch and generally falls relatively close to the band stop edge. When utilized as the output filter for a switching power supply, the attenuation notch is selected to be a sharp notch falling at the switching frequency which ordinarily is approximately an order of magnitude higher in frequency than the filter cut-off frequency. In the communication technology, component values are derived from a given minimum bandpass ripple and a given minimum attenuation outside the signal band. As an output filter for a switching power supply, minimum attenuation in the band stop is not as important as maximizing the attenuation at the switching frequency and the odd harmonics thereof. Minimizing high values of inductance and minimizing high AC current ripple in the inductors is an important consideration in utilizing a complex filter as the output filter in a switching power supply. This consideration is not significant in the communication technology.

The traditional design of a complex filter for communication signal levels utilizes the capacitor 45 of FIG. 3. Such a communication filter configuration normally exhibits erratic phase shifting behavior above the cut-off frequency. Such erratic phase behavior renders the design of the power supply feedback loop difficult. Thus, it is appreciated that although the basic topology of the filter of the present invention is related to various types of trap filters used in the communication signal level technology, the design configuration, criteria, and the element ratios utilized in the present invention for high power applications are significantly different.

Figure 5A:
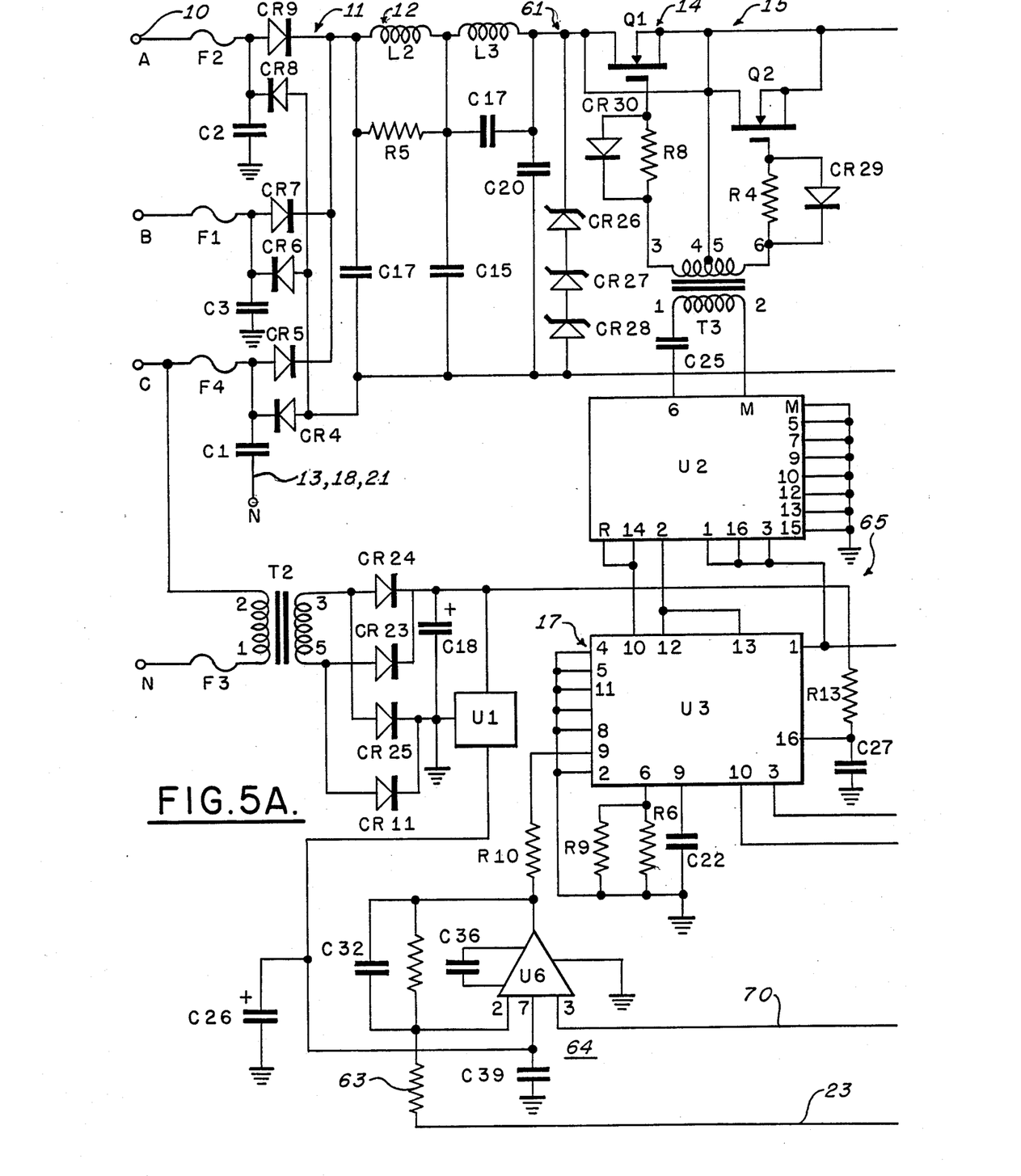
FIGS. 5A to 5C are detailed schematic wiring diagrams of a switching mode regulated power supply utilizing the output filter of the present invention.

In a preferred embodiment of the invention, with a source impedance looking into the filter of FIG. 3 of 8.5 ohms and an impedance looking out of the filter of 50 ohms, the following component values were utilized for low ripple 100 KHz operation:

Inductor 40 = 200 microhenry;
Inductor 43 = 65 microhenry;
Capacitor 44 = 0.039 microfarads; and
Capacitor 42 = 1.0 microfarad It is appreciated that capacitor 42 is the reflected equivalent from the output in a manner to be clarified with respect to FIG. 5. Such a filter design provides a smooth phase change during roll off, a greater attenuation at the switching frequency and a lower input ripple current at the switching frequency compared to prior art designs.

Figure 5B:
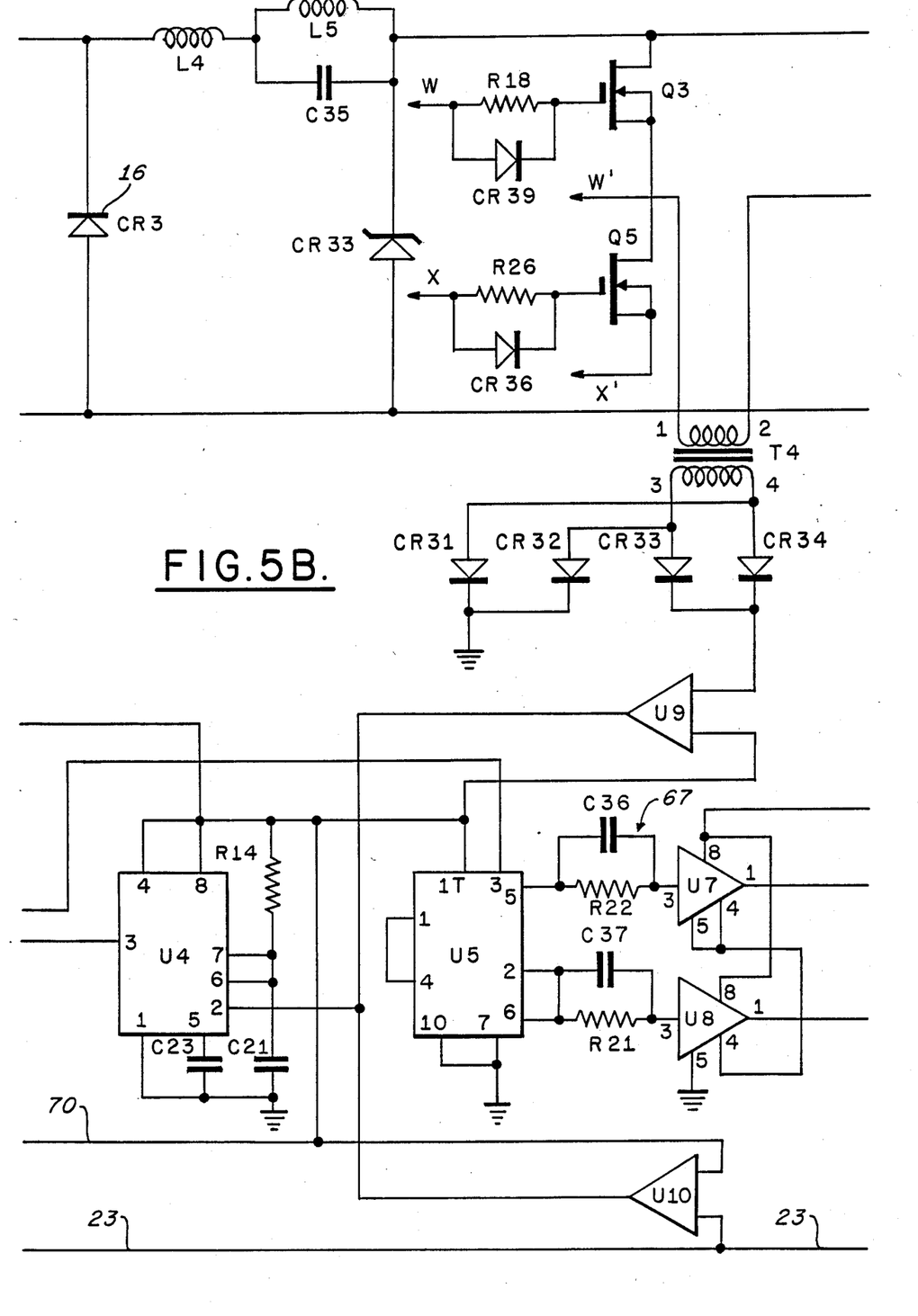
Figure 5C:
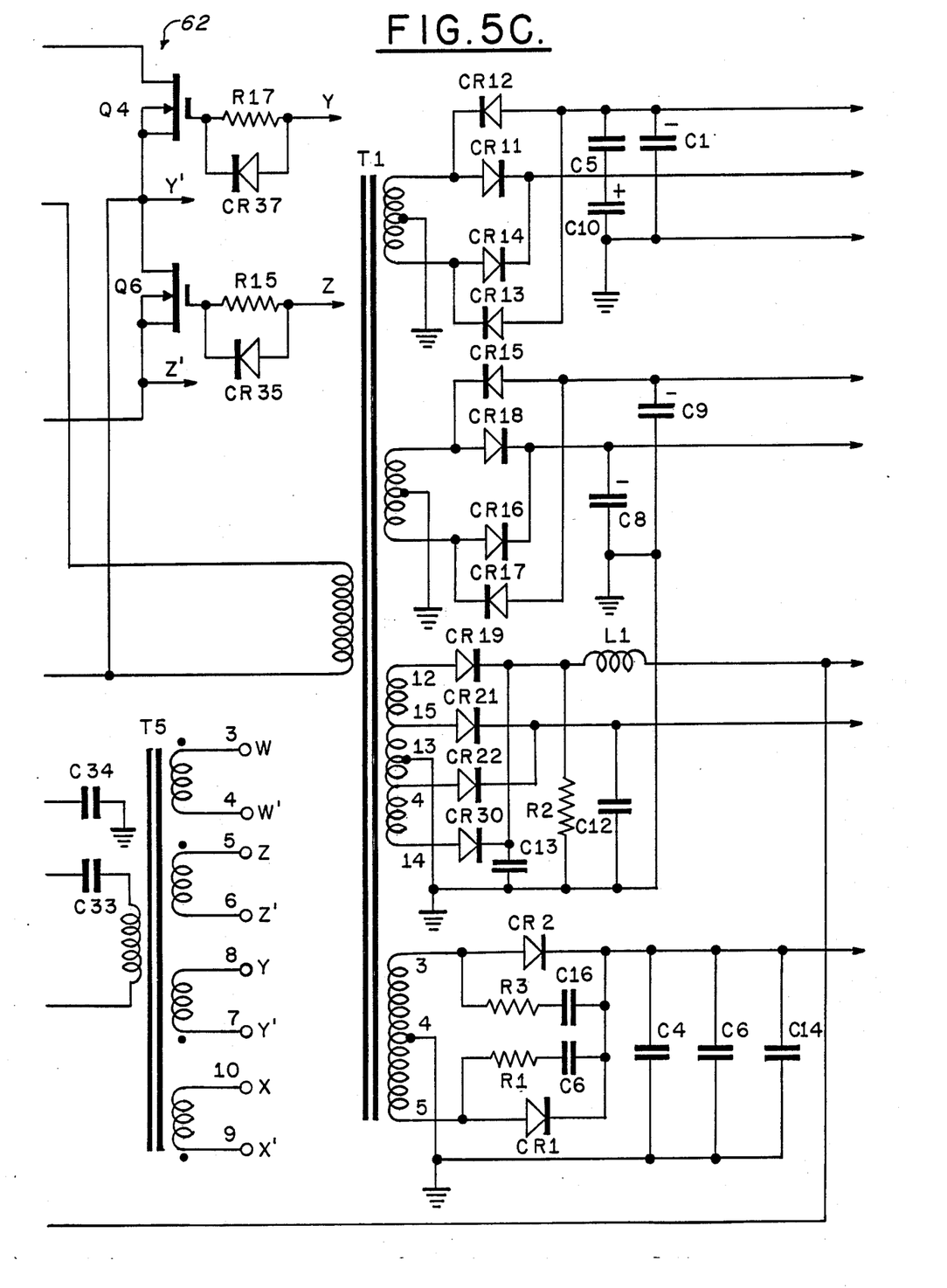

Referring to FIG. 5, in which like reference numerals indicate like components with respect to FIGS. 1 and 3, a detailed schematic wiring diagram of a switching power supply utilizing the output filter of the present invention is illustrated. The power supply of FIG. 5 is a 130 watt high density switching supply. The input rectifier section 11 is comprised of C1-3, CR4-9, C17, and F1-4. The section 11 converts three phase Y-connected 400 Hz AC power applied at terminals 10 (A,B and C) to high ripple DC power. CR4-9 perform the rectification. C1-3 and C17 partially suppress high frequency recovery spikes from the input rectifiers and noise from the internal switches. F1-4 are fuses to provide protection for the circuitry in the event of a high power component failure.

The power supply of FIG. 5 includes a housekeeping supply 60 comprised of transformer T2, CR11, 23-25, C18 and U1. U1 is a three terminal integrated circuit linear regulator which provides precisely regulated, smoothed power to the sensitive feedback loop portions of the power supply control circuits. The housekeeping supply 60 comprises a low power, transformer coupled DC power supply. The housekeeping supply provides approximately 1.5 watts of DC power referenced to the output signal ground (N) for use by the control circuitry of the switching power supply of FIG. 5.

The input filter section 12 is comprised of L2, L3, C15, C17, C19-20 and R5. The input filter 12 smooths and removes current surges introduced into the system by the switching action of the voltage regulator. The input filter 12 also blocks or partially blocks the introduction of high frequency line noise onto the three phase AC power inputs. The input filter 12 is a two section elliptic filter. Multi-section communication signal type filters in a number of configurations are often utilized in power supply inputs since the ripple requirement for the input filter components is significantly lower than the requirements for the output filter 20. The filter 12 has a higher lowpass filter break point than most input filters utilized in power supplies, making it smaller, to take advantage of the wider effective bandwidth of the regulator loop.

The power supply of FIG. 5 includes an input clipper section 61 comprising three high voltage transient suppressors or zener diodes CR26-28. The purpose of the input clipper section 61 is to clip any short duration (less than 50 microseconds) input voltage spikes that might exceed the breakdown voltage of the field effect transistor switches (Q1-2) utilized in the switch section 14. In normal operation, the input clippr 61 should remain in an inactive state.

The switch section 14 is comprised of a two pole switch that performs the pulse width modulation of the input DC voltage. The switch section 14 is comprised of Q1-2, CR29-30, R4, R8, T3, and CR3. It is appreciated that Q1-2 and the drive circuitry associated therewith comprise the normally open switch 15 of FIG. 1. Two field effect transistor switches are utilized to implement the switch 15 because this design permits the field effect transistors (when driven by out-of-phase drive signals) to approach a 100% duty cycle while retaining an AC coupled transformer drive. Utilizing two active devices also provides redundancy in the design since under normal operating conditions, either Q1 or Q2 alone could operate the supply. CR3 corresponds to the normally closed switch 16 of FIG. 1, since the polarity of the signal across CR3 changes as Q1-2 are both turned off.

The switch section 14 provides the pulsed DC voltage output (waveform 19 of FIG. 1) that has an average value (plus losses) equal to the required output voltage of the supply. The pulsed output voltage from the switch section 14 is, however, filtered to remove the unwanted switching frequency components. This is performed by L4, L5, C35 and C4, 7-13. These components form the output ripple filter 20 configured in accordance with the present invention. The output capacitor of the output filter 20 (capacitor 42 of FIG. 3) is implemented by C4 and C7-13. This capacitance is placed at the output of the filter 20 by the values thereof reflected back through the output transformer T1.

The switching power supply of FIG. 5 includes an inverter section 62. The inverter section 62 is comprised of Q3-6, R15-18, CR35-39, T1, T4, and the diodes and capacitors associated therewith (CR1-2, CR12-22, C35 and C4, 7-13). The inverter section 62 chops the smoothed and regulated DC output of the buck converter into a 50 KHz square wave to provide a voltage step down to the required low voltage output levels of the supply and to provide isolation from the input line voltages. The 50 KHz square wave is synchronized to the switching frequency of the pulse width modulator. Except for the multiplication ratio determined by the turns ratio of the output transformer T1, the inverter section 62 is essentially transparent to the output filter 20. The transformer T4 senses the output current to provide output current limiting and shut down protection for the supply via a signal provided to comparator U9. The output of the inverter section 62 constitutes the various DC output voltages of the supply after full wave rectification.

The power supply of FIG. 5 includes a feedback control section 64. The feedback control section 64 includes an operational amplifier U6 which provides an output that is proportional to the difference between the +5 V DC output of the power supply, provided on line 23, and an internal voltage reference on a line 70 and contained in U3. The output feedback is provided via a resistor 63. The internal reference on the line 70 is provided on pin 1 of U3. The passive components associated with U6 provide frequency and phase shaping of the feedback loop response to ensure adequate bandwidth and stability of the closed loop system.

The power supply of FIG. 5 includes a pulse width modulator and switch drive section 65. The section 65 includes an integrated circuit U3 containing an internal oscillator, a voltage reference and a pulse width modulator circuit. The internal oscillator is utilized to establish the operating frequency of the power supply. The pulse width modulator converts the amplitude of the error voltage provided to U3 by U6, as discussed above with respect to section 64, into a variable width pulse. When the error is small, the pulse width is short. When the error is large, the pulse width is long. The variable width pulse is synchronized to the internal oscillator. The pulses are provided to an integrated circuit pulse amplifier U2 to provide sufficient drive to turn the switches Q1-2 on and off rapidly.

The power supply of FIG. 5 also includes protection circuits 66. U4 and the passive components associated therewith provide a 50 millisecond pulse utilized to stop the operation of U3 and shut down the power supply for 50 milliseconds. The operation of U3 is halted and the power supply shutdown if overvoltage comparator U10 or overcurrent comparator U9 is triggered. The sections 64-66 comprise the pulse width modulator 17 of FIG. 1.

The power supply of FIG. 5 further includes an inverter drive section 67. The internal oscillator in U3 is coupled to a data flip-flop U5 where the output of the internal oscillator is divided by two to provide a 50% duty cycle square wave at one-half the oscillator frequency. This signal is provided through two high speed MOS clock drivers U7-8 and transformer T5 to drive the inverter bridge Q3-6. The signal from U5 operates at one-half the carrier frequency to prevent residual carrier ripple from the output filter 20 from causing an imbalanced AC signal which could saturate the output transformer T1.

It is appreciated from the foregoing that careful control of the switching frequency combined with the attenuation notch of the output filter provides improved results with a smaller, more efficient filter. The objective of the invention to reduce the physical size of the output filter of the regulator was achieved utilizing a modified present day communication filter design instead of the traditional L-C section or sections. The present invention provides increased efficiency and smaller size for a given performance level.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Power supply apparatus with switching mode voltage regulation, comprising:
   input means for providing an AC input signal;
   input rectifier and smoothing means coupled to said input means for rectifying and filtering said AC input signal to provide a smoothed DC signal;
   pulse width modulator means coupled to said input rectifier and smoothing means for pulse modulating said smoothed DC signal at a switching frequency to provide a pulsed signal having a duty cycle; and
   output filter means responsive to said pulsed signal for providing a smoothed regulated output DC voltage having a response characteristic with a cut-off frequency selected for good ripple rejection of rectified AC input signals and an attenuation notch positioned at a frequency that is at least a frequency decade above said cutoff frequency, said attenuation notch being tuned to said switching frequency.

2. The apparatus of claim 1 wherein said output filter means comprises:
   a low pass filter having:
   a first inductor, coupled to receive said pulsed signal,
   a series circuit having a resonant circuit serially coupled to said first inductor, said resonant circuit being tuned to said switching frequency; and
   a first capacitor coupled in shunt with respect to said series circuit.

3. The apparatus of claim 2 wherein said resonant circuit comprises
   a second inductor, and
   a second capacitor coupled in shunt with respect to said second inductor,
   said second inductor and second capacitor comprising said resonant circuit frequency.

4. The apparatus of claim 3 wherein said output filter includes a ground connection and wherein:
   said first inductor, said first capacitor, said second inductor and said second capacitor each have first and second terminals;
   said pulsed signal is coupled to said first terminal of said first inductor means;
   said first terminals of said second inductor and said second capacitor are connected to said second terminal of said first inductor;
   said second terminals of said second inductor and second capacitor are coupled to said first terminal of said first capacitor; and
   said second terminal of said first capacitor is coupled to said ground connection.

5. The apparatus of claim 2 further including:
   inverter means responsive to said filtered output voltage from said output filter means for providing a chopped signal in accordance therewith;
   output transformer means responsive to said chopped signal for providing an isolated AC signal in accordance therewith; and
   output rectifier means, coupled to said output transformer means and including output capacitance for rectifying and smoothing said isolated AC signal to provide said smoothed regulated output voltage;
   said output capacitance reflected back through said output transformer means to provide a reflected capacitance;
   said output transformer means coupled to said resonant circuit such that said reflected capacitance comprises said first capacitor.

* * * * *